United States Patent
Buschmann et al.

(10) Patent No.: US 9,447,549 B2
(45) Date of Patent: Sep. 20, 2016

(54) SUBSOIL TEMPERATURE MEASUREMENT BY MEANS OF A ROAD FINISHING MACHINE

(71) Applicant: JOSEPH VOEGELE AG, Ludwigshafen/Rhein (DE)

(72) Inventors: Martin Buschmann, Neustadt (DE); Tobias Gotterbarm, Limburgerhof (DE); Arnold Rutz, Ludwigshafen (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 14/249,622

(22) Filed: Apr. 10, 2014

(65) Prior Publication Data
US 2014/0308073 A1  Oct. 16, 2014

(30) Foreign Application Priority Data
Apr. 12, 2013 (EP) .................................. 13163559.1

(51) Int. Cl.
| | |
|---|---|
| *E01C 19/00* | (2006.01) |
| *E01C 19/28* | (2006.01) |
| *E01C 19/48* | (2006.01) |
| *G01J 5/02* | (2006.01) |

(52) U.S. Cl.
CPC ........... *E01C 19/002* (2013.01); *E01C 19/288* (2013.01); *E01C 19/48* (2013.01); *G01J 5/02* (2013.01)

(58) Field of Classification Search
CPC ........... E01C 23/07; E01C 23/14; G01J 5/02
USPC ...................... 404/75, 77, 79, 95, 84.05, 118
See application file for complete search history.

(56) References Cited

U.S. PATENT DOCUMENTS

| | | | | |
|---|---|---|---|---|
| 5,599,133 A | * | 2/1997 | Costello et al. ................. | 404/72 |
| 5,745,051 A | * | 4/1998 | Doherty et al. .............. | 340/905 |
| 5,839,829 A | * | 11/1998 | Litvin et al. ................... | 374/121 |
| 5,947,636 A | * | 9/1999 | Mara .......................... | 404/84.05 |
| 6,749,364 B1 | * | 6/2004 | Baker et al. ................. | 404/84.5 |

(Continued)

FOREIGN PATENT DOCUMENTS

| | | |
|---|---|---|
| DE | 102008058481 A1 | 7/2009 |
| DE | 202009016129 U1 | 3/2010 |

(Continued)

OTHER PUBLICATIONS

Dipl.-ing. Jorchen Wendebaum, Nutzung der Kerntemperaturvorhersage zur Verdichtung von Asphaltmischgue im Strassenbau, XP007921250, Tag der mundlichen Prufung: Jul. 27, 2004, 81 Pages.

(Continued)

*Primary Examiner* — Raymond W Addie
(74) *Attorney, Agent, or Firm* — Brooks Kushman P.C.

(57) ABSTRACT

A road finishing machine, comprising a screed for laying a paving layer on a subsoil and at least one temperature sensor. According to the disclosure, the temperature sensor is fixed to the road finishing machine and directed to the subsoil such that it may detect a temperature at least of a region of the subsoil which is located in front of the screed, seen in the direction of travel. In accordance with the disclosure, the temperature data of the subsoil region may be georeferenced and sent to a following compacting vehicle for determining a rolling pattern, said vehicle determining or adapting its rolling pattern based on said data.

14 Claims, 3 Drawing Sheets

(56) References Cited

U.S. PATENT DOCUMENTS

| | | | |
|---|---|---|---|
| 6,979,146 B2 * | 12/2005 | Yamada et al. | 404/71 |
| 6,998,010 B2 * | 2/2006 | Wiley | 156/309.6 |
| 7,172,363 B2 * | 2/2007 | Olson et al. | 404/75 |
| 8,099,218 B2 | 1/2012 | Glee et al. | |
| 8,356,957 B2 | 1/2013 | Weiser | |
| 8,562,246 B2 * | 10/2013 | Utterodt et al. | 404/79 |
| 8,568,058 B2 * | 10/2013 | Smieja | 404/84.05 |
| 8,714,869 B1 * | 5/2014 | Ries et al. | 404/79 |
| 8,801,325 B1 * | 8/2014 | Garland et al. | 404/77 |
| 2006/0045620 A1 | 3/2006 | Olson et al. | |
| 2008/0259730 A1 | 10/2008 | Di Federico | |
| 2009/0142133 A1 | 6/2009 | Glee et al. | |
| 2010/0189498 A1 * | 7/2010 | Doherty et al. | 404/72 |

FOREIGN PATENT DOCUMENTS

| | | |
|---|---|---|
| EP | 2366830 A1 | 9/2011 |
| JP | 06228911 A | 8/1994 |
| JP | 2002310890 A | 10/2002 |
| JP | 2012098310 A | 5/2012 |
| JP | 2012159332 A | 8/2012 |
| JP | 2013015396 A | 1/2013 |

OTHER PUBLICATIONS

European Search Report Dated Sep. 11, 2013, Application No. EP 13 16 3559, 2 Pages.

European Office Action for European Application No. 13 163 559.1, Dated Sep. 3, 2015, 4 Pages.

Japanese Office Action Dated Mar. 6, 2015, Application No. 2014-038164, Dispatch No. 107052, 3 Pages.

* cited by examiner

SUBSOIL TEMPERATURE MEASUREMENT BY MEANS OF A ROAD FINISHING MACHINE

CROSS-REFERENCE TO RELATED APPLICATIONS

This application claims foreign priority benefits under 35 U.S.C. §119(a)-(d) to European patent application number EP 13 163 559.1, filed Apr. 12, 2013, which is incorporated by reference in its entirety.

TECHNICAL FIELD

The present disclosure relates to a road finishing machine. Furthermore, the disclosure relates to a method for determining a rolling pattern of a compacting vehicle.

BACKGROUND

From U.S. Pat. No. 6,749,364 B1, a road finishing machine with a thermal imaging camera is known. The thermal imaging camera is directed onto a newly laid asphalt layer behind the screed. The thermal imaging camera is coupled to a control unit which computes the thermographic data of the thermal imaging camera with positional data. The georeferenced data may be stored by the control unit and optionally sent to other road finishing vehicles or compacting vehicles via a telematic unit, so that the latter may adjust their respective paving parameters based on said georeferenced measured data.

DE 20 2009 016 129 U1 discloses a device for measuring the temperature of the surface of hot asphalt. The device comprises a housing in which an infrared temperature sensing head is movably disposed. The latter is moved back and forth by means of a motor. This requires a complex bearing that must be lubricated regularly.

From DE 10 2008 058 481 A1, an asphalting system and method are known for setting up a plan for asphalting a working area based on a position temperature model. Here, a road finishing machine with a temperature sensor for detecting temperature data of a pavement layer behind the screed and with a receiver for detecting positional data is disclosed. The temperature sensor is formed e.g., by an infrared camera. Preferably, the temperature sensor is fixed to the screed of the road finishing machine and directed onto the newly laid paving layer behind the screed. Furthermore, the road finishing machine comprises an indicator on which the temperature data and the positional data may be indicated to the operator of the road finishing machine. The temperature data and the positional data may be forwarded to following compacting vehicles via a transmitter, so that said vehicles correspondingly adjust their compacting parameters. To detect the temperature data and the machine positional data, according to a specific embodiment, an unmanned drone could be employed which drives over the newly laid asphalt layer or in the proximity of said asphalt layer.

In the optical detection systems of U.S. Pat. No. 6,749,364 B1 and DE 10 2008 058 481 A1, temperature data of a region of the newly laid paving layer are each detected behind the screed and taken as a basis for determining a compaction pattern for following compacting vehicles. To this end, the measuring instruments for detecting temperature are fixed in the proximity of the screed or on the screed. There, however, the measuring instruments are subjected to an increased heat load and may also be disturbed in the recording of their measuring results by rising aerosols or vapors during data acquisition. It is moreover difficult to arrange the measuring instruments relatively to the screed such that they are not disturbed during measuring data acquisition by a leveling movement of the screed. The measuring instruments which are directed to the rear onto a region of the paving layer might also functionally interfere with other measuring systems, for example for layer thickness calculation. However, the temperature sensing system directed rearwards might cause interferences in the layer thickness measuring system, or vice-versa.

SUMMARY

It is now the object of the present disclosure to improve a road finishing machine with simple structural means such that the above-mentioned disadvantages of prior art may be overcome. It is also an object of the disclosure to provide a method for determining a rolling pattern without the above-mentioned disadvantages of prior art.

The present disclosure relates to a road finishing machine which comprises a screed for laying a paving layer on a subsoil and at least one temperature sensor. According to the disclosure, the temperature sensor is fixed to the road finishing machine and directed to the subsoil such that it may detect a temperature of at least one region of the subsoil which is located in front of the screed, seen in the direction of travel.

The direction of travel here means the direction of paving into which the road finishing machine is driving while it is laying a new paving layer. So, in the road finishing machine according to the disclosure, the temperature sensor does not detect, as in prior art, the temperature of a region of the newly laid paving layer but the temperature of a region of the subsoil (foundation) in front of the screed where no new paving layer has yet been laid. The paving layer may be e.g., an asphalt layer as it is known to be employed in road construction.

The disclosure offers, among other things, the advantage that temperature data detection by means of the temperature sensor is independent of a movement of the screed. Another advantage is that the measuring result of the temperature sensor is not disturbed by rising aerosols or vapors of the freshly laid paving layer. This is because no aerosols rise from the subsoil of which temperature is detected. Said aerosols in particular rise in the region of the freshly laid paving layer. Moreover, the road finishing machine offers numerous fixing possibilities for the temperature sensor, so that it may be directed onto the subsoil in front of the screed. Moreover, in the disclosure, the temperature sensor may be fixed to a point of the road finishing machine where it is subjected to only little heat by the laying of the paving layer. Finally, the measured temperature data of a subsoil region in front of the screed may be perfectly used by the road finishing machine itself for correspondingly adjusting paving parameters, where e.g. the power of the screed heating may be controlled corresponding to the subsoil temperature. This leads to a paving layer of improved quality.

The detection of the subsoil temperature offers a simple assistance for the driver of the finishing machine in his/her decision whether the laying of a new paving layer should be started, continued or stopped, depending on the value of the subsoil temperature. The disclosure also offers the possibility of providing a simple parameter for at least one compacting vehicle by transmitting the detected subsoil temperature, based on which parameter the compacting vehicle may perform a calculation of the cooling of the newly laid asphalt layer. Consequently, the parameter of the subsoil temperature may be used by the compacting vehicle, besides other parameters, such as asphalt temperature, asphalt thickness, ambient temperature, and/or wind force, to correspondingly adjust its rolling pattern.

Preferably, the temperature sensor may detect the temperature of the region of the subsoil without contacting it, leading to the temperature sensor being subjected to less wear and not leaving any traces on the subsoil.

The temperature sensor may be releasably fixed to the road finishing machine. The releasable mounting of the temperature sensor permits to remove it from the road finishing machine for servicing purposes (for example for cleaning the objective) or for maintenance tasks, or to protect it against theft. In addition, the temperature sensor may be easily retrofitted at the road finishing machine due to the releasable mounting.

Preferably, the temperature sensor is fixed to the chassis of the road finishing machine. It may be particularly stably positioned there above the subsoil where only few shocks act on the temperature sensor. Moreover, the mounting of the temperature sensor at the chassis of the road finishing machine offers the advantage of the measuring distance to the subsoil being very short, whereby the measuring result may be improved. As an alternative to the mounting at the chassis, it is of course also conceivable to fix the temperature sensor at other points of the road finishing machine. It would also be conceivable to position the temperature sensor by means of a mounting in front of, next to or under the road finishing machine. Thereby, the sensor could detect a larger region of the subsoil. It would finally also be possible to position the temperature sensor on the roof of the road finishing machine and orient it such that it detects a region of the subsoil which is located in front of and/or next to the road finishing machine, but in front of the screed, seen in the direction of travel. Positioning the temperature sensor on the roof of the road finishing machine would prevent the temperature sensor from being soiled by the subsoil. As an alternative, the temperature sensor could have a predetermined objective by which the measuring range can be adjusted.

A particularly precise measuring result of the temperature of the region of the subsoil may be obtained when the temperature sensor is a pyrometer. Pyrometers moreover have the advantage of the measuring result being immediately available as the sensor measures the thermal radiation and does not have any thermal capacity itself which would require a longer adaption to the temperature to be measured. As an alternative, the temperature sensor may be an infrared sensor, an NTC, or a PTC temperature sensor. In particular, the temperature from a large region of the subsoil may be detected if the temperature sensor is movably fixed to the road finishing machine. For example, the temperature sensor may be moved back and forth at a certain angle or drive along a complicated pattern to detect the region.

According to a further embodiment of the disclosure, the road finishing machine comprises a control unit, the temperature sensor being connected to it for forwarding the detected temperature of the region of the subsoil. The control unit is perfectly suited for reading out and processing the subsoil temperature detected by the temperature sensor. Moreover, it may be advantageous for the control unit to be designed to process the measured temperature data from the temperature sensor such that, an adaptation of at least one paving parameter, e.g., the power of the screed heating, the tamper speed, the scraper belt speed, the spreading screw speed and/or the leveling of the screed, may be automatically performed. Thereby, a higher-quality paving layer may be laid by means of the road finishing machine.

Preferably, the road finishing machine comprises a receiver with an antenna which is designed to receive the positional data and forward them to the control unit. This permits to determine an accurate positioning of the road finishing machine, in particular of the temperature sensor. It is also advantageous for the receiver to be designed as transceiver to not only receive data but also transmit data. According to an embodiment, this may be accomplished via a telecommunication network, e.g. a wireless GSM or a local radio connection, e.g., a Wi-Fi interface. By the receiver, data may be particularly well received and optionally transmitted when it is positioned on the roof of the road finishing machine. A connection between the receiver and the control unit of the road finishing machine may extend e.g., through a frame of the control platform. Thereby, the connection is well protected and unobtrusively installed at the road finishing machine.

According to a particularly advantageous embodiment of the disclosure, the control unit is designed to georeference the detected temperature of the region of the subsoil with the positional data. The georeferenced temperature data may be used for controlling at least one of the above-mentioned parameters. The georeferenced temperature data may be displayed to the driver of the finishing machine on a display, so that, depending on it, he/she may optionally stop the paving drive if the temperature of the subsoil is too cold. Preferably, the georeferenced temperature data may be sent to at least one following compacting vehicle which may adapt its rolling pattern based on them, and in particular perform a compacting control. It is also advantageous for the connection between the receiver and the control unit to permit bidirectional data communication. This permits to send the command signals from the control unit to the receiver.

Preferably, a wireless interface is provided in the control unit or in the receiver via which the georeferenced temperature of the region of the subsoil may be sent to at least one external unit, preferably to at least one compacting vehicle and/or to a central unit. Thereby, the georeferenced temperature data may also be made available to other participants, in particular on site, who, in case of a compacting vehicle, may adapt or set up a rolling pattern with them.

It is also particularly helpful to equip the road finishing machine of the disclosure with a display unit on which the detected temperature of the subsoil may be displayed to the operator. Based on the display of the temperature of the region of the subsoil, the operator could stop, for example, the laying of the paving layer on a bridge because the temperature of the subsoil to be asphalted is too low there.

Preferably, the road finishing machine is designed to show the operator when the detected temperature of the region of the subsoil reaches and/or falls below a predetermined minimum temperature. This could be done e.g., by alert signals which may be represented to the operator visually and/or acoustically by the display unit. This may prevent the laying of the paving layer to be effected on a too cold subsoil which may in particular lead to material flaws in the paving layer. Here, the asphalt would too quickly cool down on the cold subsoil and quickly harden which would lead to a subsequent compacting vehicle destroying the newly laid pavement. This shows, for example, by cracks in the paving layer which could in the worst case further break open.

According to another embodiment of the disclosure, the temperature sensor is disposed in a tube or housing. The tube or housing offers excellent protection and prevents subsoil material from striking against the temperature sensor. To provide an improved fixing possibility, the tube or housing is connected to a mounting plate which retains the tube or housing and the sensor accommodated therein at the road finishing machine.

The disclosure also relates to a method for determining a rolling pattern of a compacting vehicle. According to the disclosure, a road finishing machine sends georeferenced measured data of a temperature of the subsoil on which the road finishing machine is moving to the following compacting vehicle. Based at least on these measured data, the rolling pattern is determined for the compacting vehicle to compact a paving layer laid by the preceding road finishing machine with the compacting vehicle. By the georeferenced measured data, the following compacting vehicle may correspondingly adjust its rolling pattern by adjusting, preferably automatically, specific working parameters along the compaction section. This results in an optimum work result in the laid paving layer along the complete compaction section.

Preferably, the road finishing machine sends georeferenced measured data of a temperature of at least one region of the subsoil which is, seen in the direction of travel, in front of the screed to the following compacting vehicle. This permits flexible temperature data detection of the complete region of the subsoil over which the screed of the road finishing machine is dragged behind.

It is particularly advantageous if the detection of the georeferenced measured data of the temperature of the subsoil region is adapted to a width of the screed. This is in particular advantageous if the screed comprises laterally extendable screed extensions.

Amounts of hot asphalt lying on the subsoil which were lost, for example, during transfer by the truck may be effectively filtered by a corresponding signal processing. Thereby, the recorded and transmitted subsoil temperatures are not falsified.

Embodiments of the disclosure will be illustrated more in detail with reference to the attached drawings.

DETAILED DESCRIPTION

Figure 1:
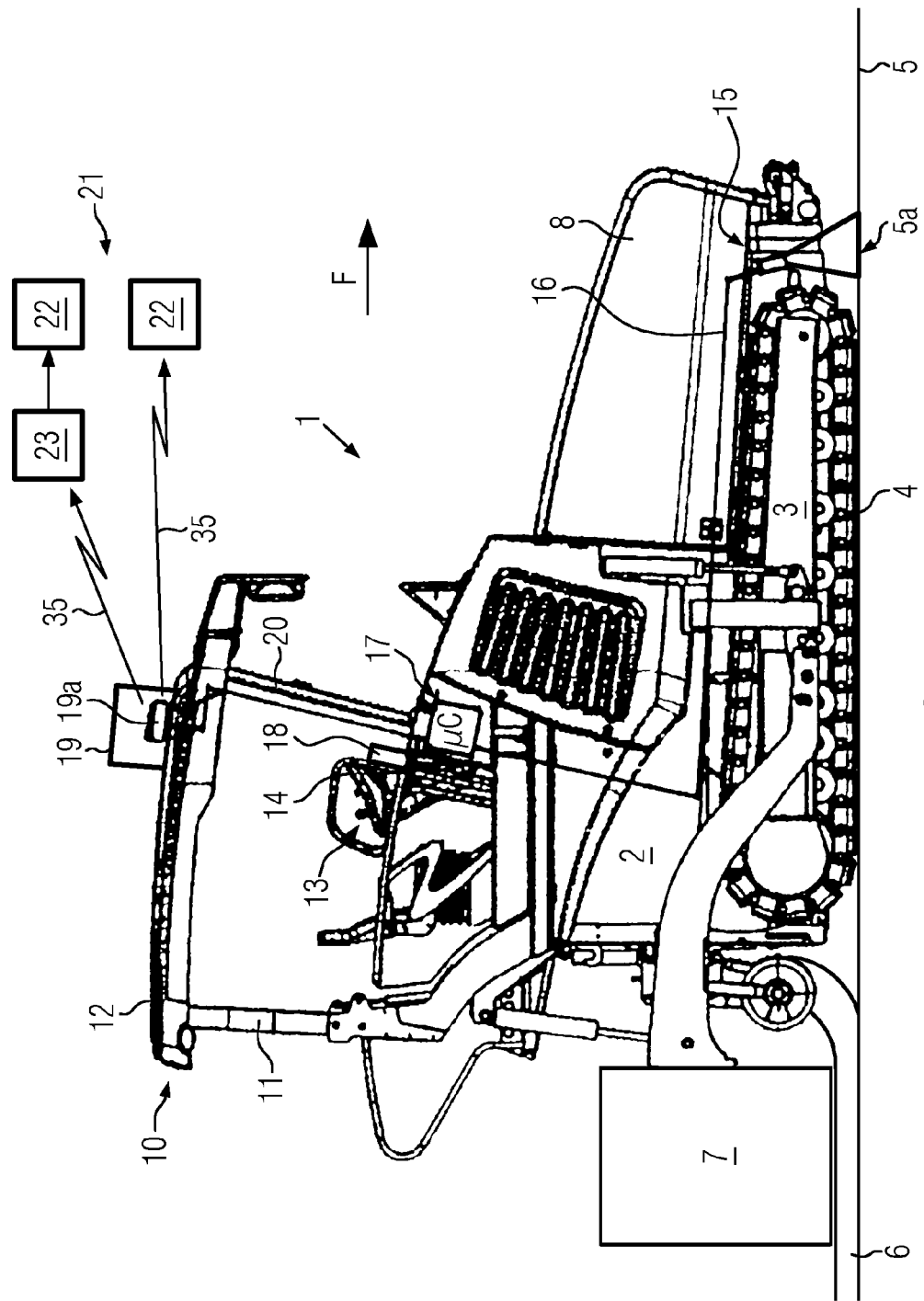
FIG. 1 shows a road finishing machine according to the disclosure with a temperature sensor for detecting the subsoil temperature.

FIG. 1 shows a road finishing machine 1. The road finishing machine 1 comprises a chassis 2 with a running gear 3. According to FIG. 1, the running gear 3 is designed as tracklaying gear, but according to another embodiment, it may also be designed as a wheel gear. The running gear 3 of the road finishing machine of FIG. 1 according to the disclosure comprises caterpillar tracks 4 which move forward in the direction of travel F on a subsoil 5. In FIG. 1, a paving layer 6 is laid on the subsoil 5 by the road finishing machine 1 according to the disclosure. For this, the road finishing machine 1 according to the disclosure comprises a height adjustable screed 7. By means of the screed 7, the road finishing machine 1 according to the disclosure may make the newly laid paving layer 6 level and precompact it.

The road finishing machine 1 furthermore comprises a material bunker 8 which is provided for receiving paving material for the paving layer 6. From the material bunker 8, the paving material is guided rearwards via a non-depicted conveyor device to a spreading screw 9. The paving material is distributed on the subsoil 5 by the spreading screw 9 and compacted by the following screed 7.

The road finishing machine 1 in FIG. 1 also comprises a control platform 10 from which an operator may navigate the road finishing machine 1. The control platform 10 comprises a support structure 11 on which a roof 12 is mounted. The roof 12 gives shadow and keeps away rain from the operator.

A control console 13 is provided in the control platform 10. By means of the control console 13, the operator may navigate the road finishing machine 1. The control console 13 may comprise a display unit 14, for example a display, to indicate certain operating parameters to the operator. It is advantageous for the display unit 14 to comprise a color display by which a heat image of the subsoil 5 may be indicated to the operator.

Seen in the direction of travel F in front of the running gear 3, a temperature sensor 15 is fixed to the road finishing machine 1, in particular to the chassis 2 of the road finishing machine 1. The temperature sensor 15 is directed onto the subsoil 5 to detect temperature data at least of a region of the subsoil 5. The temperature sensor 15 may be in particular fixed to the road finishing machine 1 such that it may detect temperature data of a region in front of the caterpillar track 4. Of course, one or several temperature sensors 15 each may be fixed to the road finishing machine 1 in front of both caterpillar tracks 4 of the road finishing machine 1 to detect the respective regions in front of the two caterpillar tracks 4.

The temperature sensor 15 of FIG. 1 is functionally coupled to a control unit 17 via a connection 16. Preferably, the connection 16 may support bidirectional communication between the control unit 17 and the temperature sensor(s) 15. This permits to activate and/or control the temperature sensor(s) 15 from the control unit 17 depending on the situation, for example to adjust the temperature sensor 15.

The control unit 17 is coupled to the control console 13 by means of a further connection 18, whereby data processed by the control unit 17 may be displayed on the display unit 14 of the control console 13. The further connection 18 may also be designed for bidirectional communication.

On the roof 12 of the control platform 10, a receiver 19 with an antenna 19a is arranged. According to another embodiment of the disclosure, the receiver, in particular the GNSS receiver, and a GSM module connected to the receiver may be arranged in the control platform, an antenna system being arranged on the roof which comprises both a GNSS antenna (e.g., GPS antenna) and a GSN antenna. The receiver 19 is preferably a GNSS receiver, for example a GPS receiver, which is designed to detect a spatial reference for the detected temperature data of the region of the subsoil 5. The receiver 19 is fixed, seen in the direction of travel F, in the front on the roof of the road finishing machine 1, where it is not disturbed by thermal radiation from the paving layer 6, and connected to the control unit 17 via a cable 20. Preferably, the receiver 19 is embodied as transceiver and designed not only for receiving GNSS/GPS data but also for sending georeferenced temperature data of the detected subsoil region. However, in addition to the receiver 19, a separate wireless transmission unit may be provided to transmit the georeferenced temperature data of the subsoil region.

When the road finishing machine 1 drives over the subsoil 5 in the direction of travel F for laying the paving layer 6, the operator may activate and control the temperature sensor 15 from the control platform 10 via the control console 13, so that the latter detects the temperature at least of a region of the subsoil 5. The detected temperature data of the subsoil 5 are forwarded via the connection 16 to the control unit 17 which is configured to georeference the temperature data with the positional data of the receiver 19. The resulting position-related temperature data of the subsoil 5 may preferably be indicated in real time to the operator on the display unit 14 of the control console 13. Here, the temperature data of the subsoil 5 may be supplemented by an indication of additional heat image data which are generated by a further measuring device (not shown) for the freshly laid asphalt, so that the driver of the finishing machine obtains both temperature data on the subsoil 5 and temperature data on the newly laid asphalt layer. Based on this, the operator may, either himself/herself or by automatic operation, adjust the adaptation of certain paving parameters of the road finishing machine 1.

The subsoil temperature may be sent from the road finishing machine 1 to external units 21, in particular to one or several compacting vehicles 22 and/or a server 23. The server 23 may inform the compacting vehicle or the compacting vehicles 22 about the georeferenced temperature data of the road finishing machine 1 it has received.

By receiving the georeferenced temperature data of the road finishing machine 1, the following compacting vehicle 22 may determine a rolling pattern 22 or plan it anew. Here, compacting parameters determined by the compacting vehicle 22 itself may be adapted to the georeferenced temperature data of the subsoil region sent from the road finishing machine 1.

Figure 2:
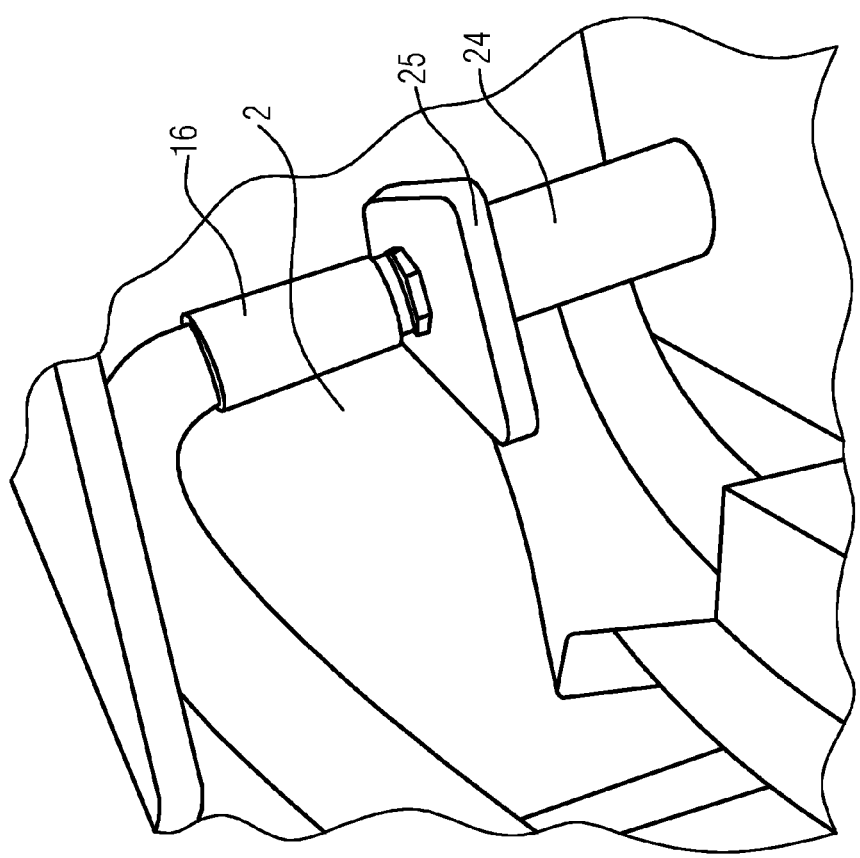
FIG. 2 shows an enlarged representation of the installation point of the temperature sensor at the road finishing machine according to the disclosure.

FIG. 2 shows the place of installation of the temperature sensor 15 at the road finishing machine 1 in an enlarged representation. The temperature sensor 15, e.g., a pyrometer, is disposed in a tube 24 which protects the temperature sensor 15. The tube 24 in particular protects the temperature sensor 15 from moisture and loose subsoil material. The tube 24 is fixed on a plate 25. The plate 25 is fixed to the road finishing machine 1 such that it correspondingly orients the tube 24 to the subsoil 5. The connection 16 extends from the side of the plate 25 facing away from the tube 24 and functionally couples the temperature sensor 15 to the control unit 17.

It is conceivable for the plate 25 to be permanently welded to the chassis 2 of the road finishing machine 1 to provide an orientation aid for the tube 24. The tube 24 and/or the connection 16 may be releasably fixed to the plate 25, whereby maintenance and servicing works may be more easily performed at the temperature sensor 15. In particular, the tube 24, the temperature sensor 15 not represented in FIG. 2, and/or the connection 16 may be fixed to the plate 25 by screwing.

By the temperature sensor 15 being positioned in front of the running gear 3 of the road finishing machine 1, seen in the direction of travel F, it is not subjected to major heat loads. This effect is even enhanced if the material bunker walls of the material bunker 8 are well insulated. In contrast to this, a mounting of the temperature sensor 15 at or in the proximity of the screed 7 would result in high heat loads on it. This would result in an increased maintenance demand and special, in particular expensive, requirements on the installation of the temperature sensor 15 and on itself.

Figure 3:
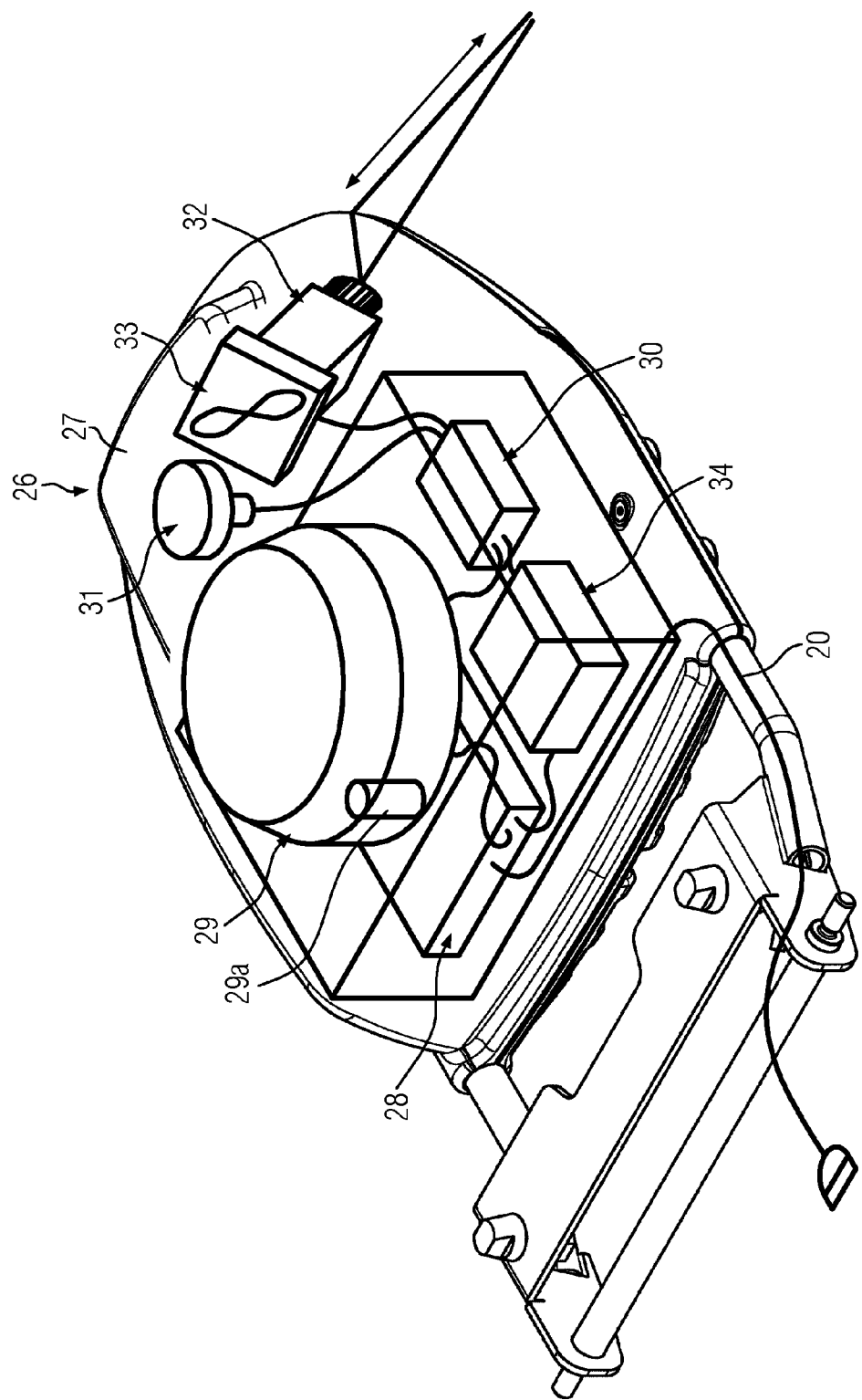
FIG. 3 shows a temperature measuring device according to an embodiment of the disclosure.

FIG. 3 shows a measuring device 26 which may be fixed, instead of the temperature sensor 15, to the road finishing machine 1 such that it may be used for heat image detection of at least a region of the subsoil 5. The measuring device 26 could in particular be disposed in the direction of travel F in the front on the roof 12 of the road finishing machine 1 to detect a heat image of the subsoil in front of and/or next to the road finishing machine 1, but in front of the paving layer 6.

The measuring device 26 forms a compact module for detecting and transmitting georeferenced temperature data of the subsoil region. For this, the measuring device 26 comprises a housing 27 in which all components for detecting and transmitting georeferenced temperature data are disposed. In particular, a computer for temperature processing 28, a GPS receiver with antenna 29, an RTK radio unit 30 which is connected to an RTK antenna 31, an infrared camera 32 for recording the heat image of the subsoil region, a blower 33, and a power supply 34 are arranged in the housing 27 of the measuring device 26. The above designated components of the measuring device 26 are functionally linked to each other such that they may produce a georeferenced heat image of the subsoil region which may be communicated to the control console 13 of the road finishing machine 1 by means of a data cable 35. Equally, the georeferenced heat image data may be sent to the external units 21 by means of the measuring device 26, in particular by means of a wireless interface of the computer 28, to be advantageously used by them, as described above, for determining the working parameters.

In accordance with the disclosure, the temperature detection of the subsoil 5, or the temperature detection at least of a region of the subsoil 5 on which the road finishing machine 1 is driving while it is laying the paving layer 6, may be perfectly used for adapting certain paving parameters of the road finishing machine 1 and/or for adapting certain compacting parameters of at least one compaction vehicle 22 following the road finishing machine 1. Here, it is particularly advantageous that the subsoil temperature of the subsoil 5, on which the road finishing machine has not yet installed any paving layer 6, may be easily detected and, simple means in accordance with the disclosure that may be easily serviced may be employed for this, compared to other well-known temperature measuring systems. Moreover, the disclosure does not involve any risk of the means required for subsoil temperature recording interfering with other measuring systems, whereby in particular the laying quality of the paving layer 6 may be improved and the operability of the road finishing machine 1 facilitated.

According to the above description, all components for temperature and positional data detection are fixed to the road finishing machine 1. It would also be conceivable that a part of or all components for producing the georeferenced temperature data are supported by one or several separate vehicles, for example a drone which drives in front of the newly laid paving layer 6 next to and/or in front of the road finishing machine 1 in its proximity for a heat image recording of the subsoil 5. Said drone could drive, for example, on the subsoil 5 in front of the paving layer 6 by means of distance control relative to the road finishing machine 1 and be controlled from the road finishing machine 1.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A road finishing machine comprising:
a chassis;
a screed for laying a paving layer on a subsoil, the screed being associated with the chassis;
a temperature sensor fixed to the chassis and directable to the subsoil such that the temperature sensor may detect a temperature of at least a region of the subsoil which is located in front of the screed, as seen in the direction of travel of the road finishing machine;
a display unit configured to display the detected temperature of the region of the subsoil to an operator;
a control unit, the temperature sensor being connected to the control unit for forwarding the detected temperature of the region of the subsoil; and
a receiver with an antenna embodied to receive positional data and forward the positional data to the control unit;
wherein the control unit is embodied to georeference the detected temperature of the region of the subsoil with the positional data, the road finishing machine is configured to use the georeferenced temperature for controlling at least one paving parameter, and the road finishing machine is further configured to display to the operator when the detected temperature of the region of the subsoil reaches and/or falls below a predetermined minimum temperature.

2. The road finishing machine according to claim 1, wherein the temperature sensor is capable of detecting the temperature of the region of the subsoil without contacting it.

3. The road finishing machine according to claim 1, wherein the temperature sensor is releasably mounted to the chassis.

4. The road finishing machine according to claim 1, wherein the temperature sensor is mounted to the chassis to detect a temperature of a region of the subsoil in front of the chassis.

5. The road finishing machine according to claim 1, wherein the temperature sensor is one of a pyrometer, an infrared sensor, an NTC temperature sensor or a PTC temperature sensor.

6. The road finishing machine according to claim 1, wherein the temperature sensor is movably mounted to the chassis.

7. The road finishing machine of claim 1 wherein the chassis comprises a running gear, and the temperature sensor is fixed to the chassis in front of the running gear.

8. The road finishing machine of claim 1 wherein the road finishing machine is configured to automatically adjust the at least one paving parameter based on the georeferenced temperature.

9. The road finishing machine according to claim 1 wherein the at least one paving parameter comprises heating power of the screed, and wherein the road finishing machine is configured to automatically adjust the heating power of the screed based on the georeferenced temperature.

10. The road finishing machine according to claim 1, further comprising at least one wireless interface via which the georeferenced temperature of the region of the subsoil may be sent to at least one external unit.

11. The road finishing machine according to claim 1, wherein the temperature sensor is disposed in a tube.

12. A road finishing machine comprising:
a chassis;
a screed for laying a paving layer on a subsurface, the screed being associated with the chassis; and
a temperature sensor fixed to the chassis and configured to be directed to the subsurface to detect a temperature of a region of the subsurface located in front of the screed, as seen in the direction of travel of the road finishing machine;
a control unit configured to receive temperature data for the detected temperature of the region of the subsurface from the temperature sensor; and
a receiver with an antenna embodied to receive positional data and forward the positional data to the control unit;
wherein the control unit is embodied to georeference the temperature data with the positional data, and the road finishing machine is configured to automatically adjust heating power of the screed based on the georeferenced temperature data.

13. The road finishing machine of claim 12 wherein the chassis comprises a running gear, and the temperature sensor is fixed to the chassis in front of the running gear.

14. A method for determining a rolling pattern of a compacting vehicle that is following a road finishing machine, the method comprising:
the road finishing machine transmitting georeferenced measured data of a temperature of subsoil on which the road finishing machine is moving to the following compacting vehicle; and
determining a rolling pattern for the compacting vehicle based at least on the georeferenced measured data to compact a paving layer laid by the preceding road finishing machine with the compacting vehicle;
wherein the georeferenced measured data includes a georeferenced temperature of at least a region of the subsoil which is located in front of a screed of the road finishing machine, as seen in the direction of travel of the road finishing machine, and wherein the road finishing machine is configured to automatically adjust heating power of the screed based on the georeferenced temperature of the region of the subsoil.

* * * * *